US010239610B2

(12) United States Patent
Fenny et al.

(10) Patent No.: US 10,239,610 B2
(45) Date of Patent: Mar. 26, 2019

(54) COMPACT LINEAR HYDRAULIC ACTUATOR

(71) Applicant: Bell Helicopter Textron Inc., Fort Worth, TX (US)

(72) Inventors: Carlos A. Fenny, Fort Worth, TX (US); Carl T. Elving, Southlake, TX (US); Rodney M. Cahoon, Fort Worth, TX (US); Charles Eric Covington, Colleyville, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 204 days.

(21) Appl. No.: 15/062,375

(22) Filed: Mar. 7, 2016

(65) Prior Publication Data
US 2016/0264239 A1   Sep. 15, 2016

Related U.S. Application Data

(60) Provisional application No. 62/131,014, filed on Mar. 10, 2015.

(51) Int. Cl.
*B64C 27/64* (2006.01)
*B64C 27/605* (2006.01)
*F15B 15/14* (2006.01)

(52) U.S. Cl.
CPC ............ *B64C 27/64* (2013.01); *B64C 27/605* (2013.01); *F15B 15/1457* (2013.01); *F15B 15/1466* (2013.01); *F15B 2211/7054* (2013.01); *F15B 2211/7055* (2013.01)

(58) Field of Classification Search
CPC ....... B64C 27/605; B64C 27/64; B64C 13/40; B64C 2013/506; B64C 2027/004; B64C 25/22; F15B 15/1457; F15B 15/1447; F15B 15/1428; F15B 15/1466; F15B 11/123
See application file for complete search history.

(56) References Cited

U.S. PATENT DOCUMENTS

| | | | | |
|---|---|---|---|---|
| 5,400,696 A | * | 3/1995 | Weber | F15B 15/08 92/137 |
| 2006/0054016 A1 | * | 3/2006 | Davies | F15B 15/1409 92/109 |
| 2008/0015796 A1 | * | 1/2008 | Dlugosch | F15B 15/14 702/34 |
| 2008/0168897 A1 | * | 7/2008 | Guay | F15B 15/1457 92/51 |
| 2009/0308243 A1 | * | 12/2009 | Tillaart | E02F 9/2271 92/171.1 |
| 2010/0084517 A1 | * | 4/2010 | Benson | B64C 27/605 244/228 |

(Continued)

*Primary Examiner* — Assres H Woldemaryam
(74) *Attorney, Agent, or Firm* — Patent Capital Group

(57) ABSTRACT

In some embodiments, an actuator includes a chamber, a piston disposed within the chamber, and a tube. The chamber has a first port and a second port. The piston comprises a first surface, a second surface, and an elongated conduit coupling the first surface to the second surface. The first surface is disposed between the first port and the second port. The second surface is offset from the first surface. The tube is disposed at least partially within the elongated conduit of the piston. The tube comprises a third port disposed within the elongated conduit of the piston and a fourth port disposed outside of the elongated conduit of the piston.

14 Claims, 3 Drawing Sheets

(56) References Cited

U.S. PATENT DOCUMENTS

| | | | | |
|---|---|---|---|---|
| 2012/0199699 A1* | 8/2012 | Isaac | ................... | B64C 29/0033 |
| | | | | 244/7 R |
| 2012/0292456 A1* | 11/2012 | Hollimon | ................ | B64C 27/28 |
| | | | | 244/7 A |
| 2013/0119196 A1* | 5/2013 | Lindahl | ................... | B64C 25/22 |
| | | | | 244/100 R |
| 2013/0209252 A1* | 8/2013 | Dickman | .............. | B64C 27/605 |
| | | | | 416/1 |
| 2013/0276516 A1* | 10/2013 | Tabor | ................. | G01M 99/008 |
| | | | | 73/37 |
| 2014/0034779 A1* | 2/2014 | Fenny | .................... | B64C 27/72 |
| | | | | 244/17.25 |
| 2014/0263854 A1* | 9/2014 | Ross | ................... | B64C 29/0033 |
| | | | | 244/7 A |
| 2014/0263855 A1* | 9/2014 | Ross | .................. | B64C 29/0075 |
| | | | | 244/7 A |
| 2015/0175259 A1* | 6/2015 | Foskey | ................... | B64C 27/72 |
| | | | | 416/31 |
| 2015/0300908 A1* | 10/2015 | Laramee | ............ | G01M 3/2869 |
| | | | | 116/201 |

* cited by examiner

COMPACT LINEAR HYDRAULIC ACTUATOR

RELATED APPLICATIONS

Pursuant to 35 U.S.C. § 119 (e), this application claims priority to U.S. Provisional Patent Application Ser. No. 62/131,014, entitled COMPACT LINEAR HYDRAULIC ACTUATOR, filed Mar. 10, 2015. U.S. Provisional Patent Application Ser. No. 62/131,014 is hereby incorporated by reference.

TECHNICAL FIELD

This invention relates generally to actuation systems, and more particularly, to a compact linear hydraulic actuator.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to provide a linear hydraulic actuator that is both compact and provides a long stroke. A technical advantage of one embodiment may also include the capability to utilize triplex cylinders with inverted unbalanced-area pistons. A technical advantage of one embodiment may include the capability to provide forty percent more stroke length for a given actuator envelope length and provide increased failure tolerance over conventional dual parallel or dual tandem actuator configurations.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
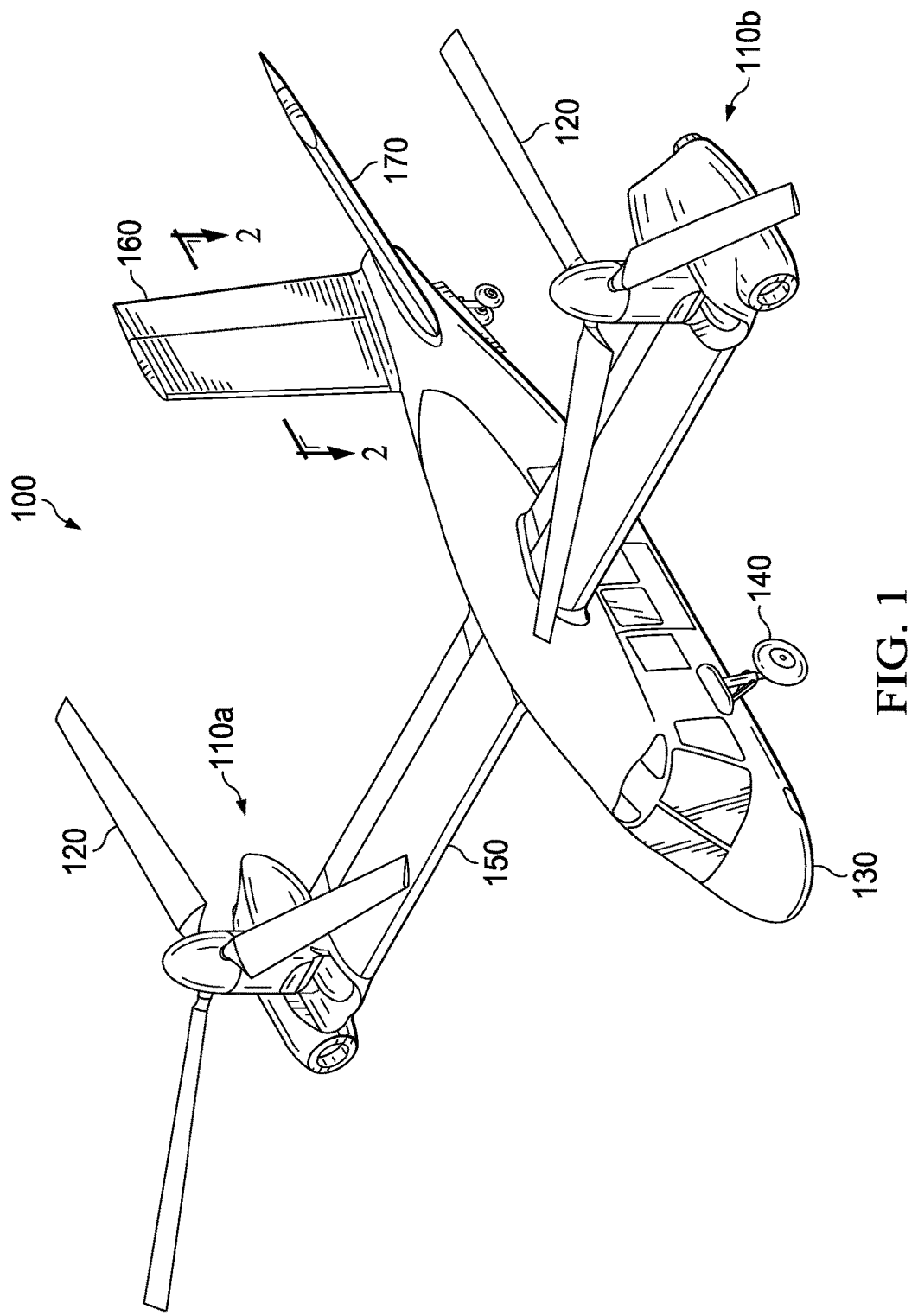
FIG. 1 shows a rotorcraft according to one example embodiment.

FIG. 1 shows a rotorcraft 100 according to one example embodiment. Rotorcraft 100 features rotor systems 110a and 110b, blades 120, a fuselage 130, a landing gear 140, a wing 150, and an empennage 160.

Rotor system 110 may rotate blades 120. Rotor system 110 may include a control system for selectively controlling the pitch of each blade 120 in order to selectively control direction, thrust, and lift of rotorcraft 100. In the example of FIG. 1A, rotorcraft 100 represents a tiltrotor aircraft, and rotor systems 110a and 110b feature rotatable nacelles. In this example, the position of nacelles 110a and 110b, as well as the pitch of rotor blades 120, can be selectively controlled in order to selectively control direction, thrust, and lift of tiltrotor aircraft 100.

Fuselage 130 represents the main body of rotorcraft 100 and may be coupled to rotor system 110 (e.g., via wing 150) such that rotor system 110 and blades 120 may move fuselage 130 through the air. Landing gear 140 supports rotorcraft 100 when rotorcraft 100 is landing and/or when rotorcraft 100 is at rest on the ground.

Teachings of certain embodiments relating to rotor systems described herein may apply to rotor system 110 and/or other rotor systems, such as non-tilting rotor and helicopter rotor systems. It should also be appreciated that teachings from rotorcraft 100 may apply to aircraft other than rotorcraft, such as airplanes and unmanned aircraft, to name a few examples.

In the example of FIG. 1, tiltrotor aircraft 100 may operate in a helicopter mode by tilting the nacelles upright and in an airplane mode by tilting the nacelles forward. Tiltrotor aircraft 100 may generate greater forward speed in airplane mode than in helicopter mode because, in airplane mode, blades 120 are oriented to generate greater thrust propelling the aircraft forward (somewhat analogous to a propeller).

Rotorcraft 100 also features at least one empennage 160. Empennage 160 represents a flight control surface coupled to the tail portion of fuselage 130. In the example of FIG. 1, rotorcraft 100 features two empennages 160. In this example embodiment, the combination of the two empennages 160 may represent a v-tail configuration.

In operation, according to one example embodiment, the control system of rotor system 110 may include a swashplate 112 in mechanical communication with blades 120. Repositioning the swashplate 112 may change the pitch of each blade 120 collectively or cyclically so as to selectively control the direction, thrust, and lift of rotorcraft 100.

In some embodiments, one or more linear hydraulic actuators may be provided to reposition swashplate 112 during operation of the aircraft. In some tiltrotor aircraft, the swashplate actuators may have three times the stroke length of a conventional helicopter's swashplate actuator. In addition, the installation envelope for a tiltrotor swashplate actuator may be significantly more constrained as compared to the installation envelope for a conventional helicopter's swashplate actuator. Furthermore, such an actuator should be capable preventing small, uncontrolled actuator motions in the event of a flight control system failure.

Figure 2:
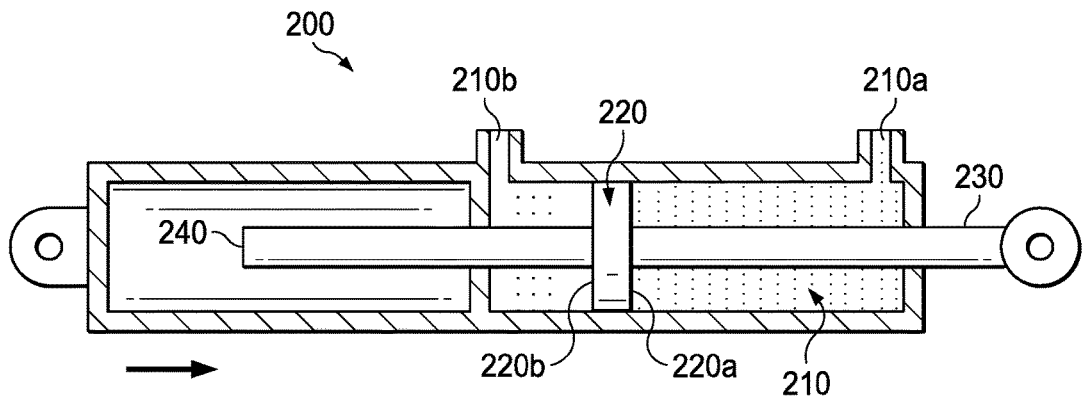
FIG. 2 shows a balanced hydraulic actuator.
Figure 3:
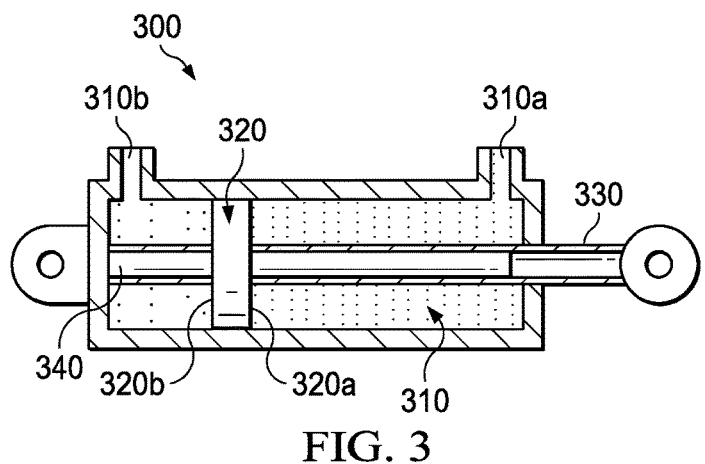
FIG. 3 shows an unbalanced hydraulic actuator.

Linear hydraulic actuators may have two primary types of piston/cylinder configurations: balanced and unbalanced. FIG. 2 shows a balanced hydraulic actuator 200 according to one example embodiment, and FIG. 3 shows an unbalanced hydraulic actuator 300 according to one example embodiment.

Balanced hydraulic actuator 200 features a chamber 210, a piston 220, a piston rod 230, and a balance rod 240. Piston 220 is positioned within chamber 210 so as to divide chamber 210 into a retract chamber portion 210a and an extend chamber portion 210b. In operation, increasing hydraulic pressure in retract chamber portion 210a causes hydraulic fluid to apply a pressure against a retract piston surface 220a of piston 220, which causes piston 220 to move piston rod 230 in a retract direction. Likewise, increasing hydraulic pressure in extend chamber portion 210b causes hydraulic fluid to apply a pressure against an extend piston surface 220b of piston 220, which causes piston 220 to move piston rod 230 in an extend direction.

In the example balanced-piston configuration of FIG. 2, retract piston area 220a and extend piston area 220b have the same surface area. Because the force output of the actuator is equal to the piston area multiplied by the applied pressure, the extend and retract force output for a balanced piston actuator are equal for the same applied pressure. To achieve a balanced piston area, balance rod 240 has the same diameter as piston rod 230. If one desires an extend piston area smaller or larger than the retract area, one may make the diameter of balance rod 240 larger or smaller relative to the diameter of piston rod 230. An additional benefit provided by the use of a balance rod may include improved column stability that helps balanced hydraulic actuator 200 react to side loads across two end glands. The balanced piston configuration, however, may double the length of actuator's envelope.

To minimize a linear hydraulic actuator's length, an "unbalanced piston" piston/cylinder configuration may be used. In the example of FIG. 3, unbalanced hydraulic actuator 300 features a chamber 310, a piston 320, a piston rod 330, and a balance tube 340. Piston 220 is positioned within chamber 210 so as to divide chamber 310 into a retract chamber portion 310a and an extend chamber portion 310b. In operation, increasing hydraulic pressure in retract chamber portion 310a causes hydraulic fluid to apply a pressure against a retract piston surface 320a of piston 320, which causes piston 320 to move piston rod 330 in a retract direction. Likewise, increasing hydraulic pressure in extend chamber portion 310b causes hydraulic fluid to apply a pressure against an extend piston surface 320b of piston 320, which causes piston 320 to move piston rod 230 in an extend direction.

In the example unbalanced-piston configuration of FIG. 3, extend piston area 320b is larger than retract piston area 320a. This may be due to the effective area of piston rod 330 subtracting from only retract piston area 320a. Because the force output of the actuator is equal to the piston area multiplied by the applied pressure, the extend force output may be greater than the retract force output. To reduce the difference between the extend and retract force outputs, a "balance tube" may be inserted in the center of the piston rod. Although the balance tube may reduce the magnitude difference between the extend and retract force outputs, the extend force output will still be greater. Additionally, since side loads can only be reacted by one gland, actuators without balance rods may have less column stability, especially when fully extended.

For tiltrotor swashplate applications, the predominant load direction may place the actuator in tension, requiring the retract piston area to be under almost continuous pressure to control rotor loading. For piston-area sizing of a tiltrotor actuator, teachings of certain embodiments recognize that the retract area for the piston should be larger than the extend area to react the predominant load direction and minimize uncontrolled actuator motion in the event of a system failure. Using a balanced piston configuration, however, may result in an excessively long actuator, and using an unbalanced piston configuration may not provide the desired larger retract piston area or the necessary column stability.

Figure 4:
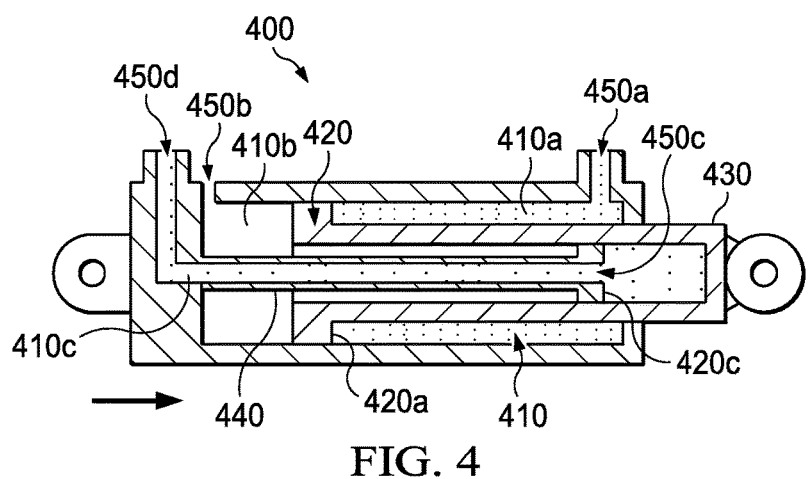
FIG. 4 shows an inverted, unbalanced hydraulic actuator according to one example embodiment.

Accordingly, teachings of certain embodiments recognize the capability to provide an improved piston area sizing for tiltrotor swashplate actuators by venting the conventional extend piston area to atmosphere. FIG. 4 shows an inverted, unbalanced hydraulic actuator 400 according to one example embodiment. In the example of FIG. 4, unbalanced hydraulic actuator 400 features a chamber 410, a piston 420, a piston rod 430, and a pressurized balance tube 440. Piston 420 is positioned within chamber 410 so as to divide chamber 410 into a retract chamber portion 410a and an atmosphere chamber portion 410b. Pressurized balance tube 440 further divides atmosphere chamber 410b so as to provide an extend chamber portion 410c at least partially within atmosphere chamber portion 410b.

In operation, increasing hydraulic pressure in retract chamber portion 410a causes hydraulic fluid to apply a pressure against a retract piston surface 420a of piston 420, which causes piston 420 to move piston rod 430 in a retract direction. Likewise, increasing hydraulic pressure in extend chamber portion 410b causes hydraulic fluid to apply a pressure against an extend piston surface 420c of piston 420, which causes piston 420 to move piston rod 430 in an extend direction. Piston rod 430 comprises an elongated conduit extending between and coupling surfaces 420a and 420c. Chamber 410 includes two ports 450a, 450b, separated by retract piston surface 420a. The port 450b is vented to atmosphere. Balance tube 440 includes two ports 450c, 450d. Port 450c is disposed within the elongated conduit of piston rod 430 and port 450d is disposed outside the elongated conduit of piston rod 430.

In this example embodiment, hydraulic pressure applied inside the balanced tube and piston rod may create an "inverted unbalanced" cylinder configuration where the extend piston area is smaller than the retract area, as seen in the example of FIG. 4. Teachings of certain embodiments recognize the capability to provide a larger retract piston area, such as seen in a balanced piston configuration, in a shorter envelope, such as seen in an unbalanced piston configuration.

Figure 5:
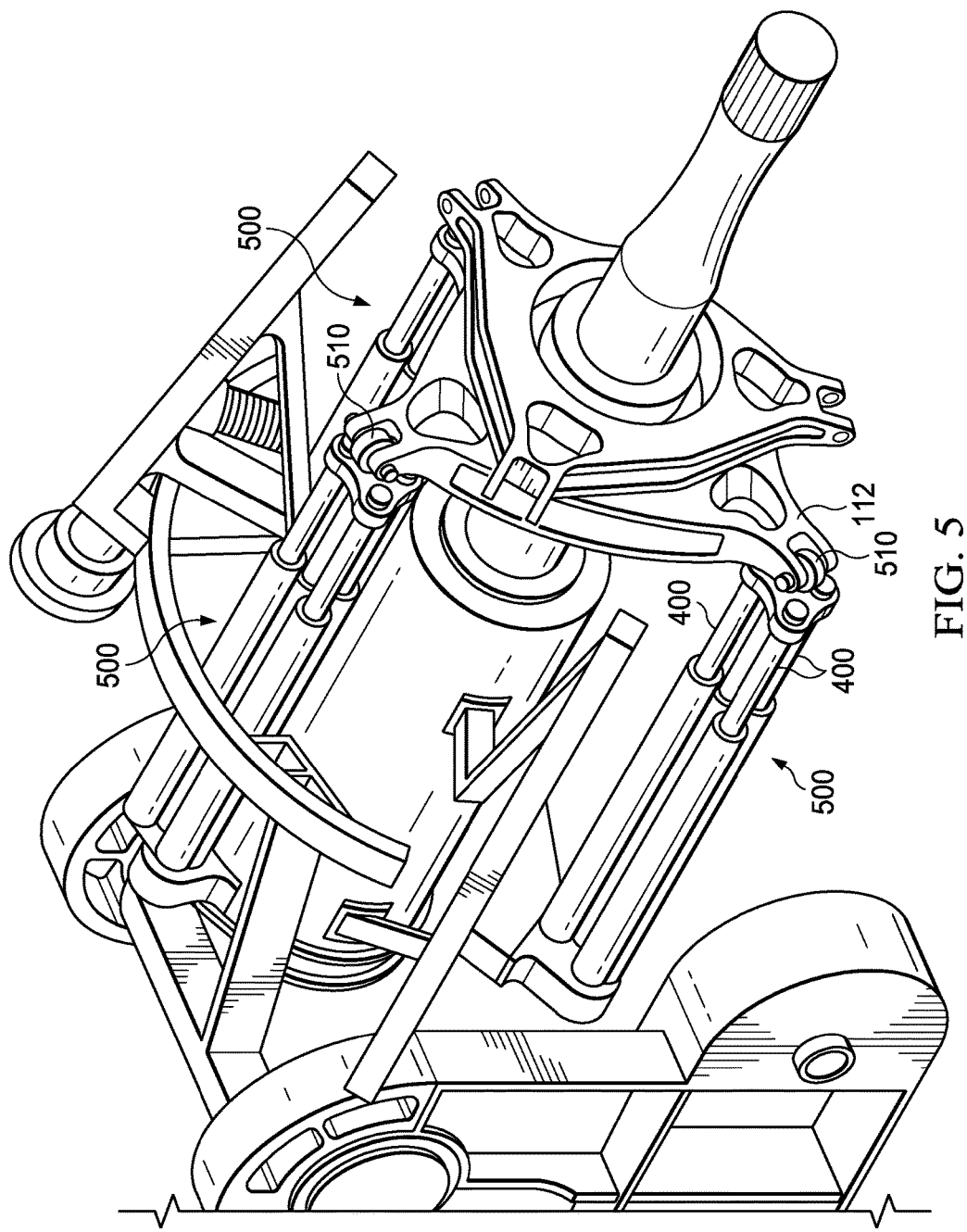
FIG. 5 shows the hydraulic actuator of FIG. 4 installed on the rotorcraft of FIG. 1.

To improve the column stability of the actuator and provide system redundancy to manage flight control system failures, three inverted, unbalanced hydraulic actuators 400 may be jointed together in a triangular configuration, such as seen in the example of FIG. 5. FIG. 5 shows an actuator installation for the left nacelle of the tiltrotor aircraft of FIG. 1. In this example embodiment, three actuators 400 are connected to a common yoke 510 to provide a single output and increase the column stability of each actuator assembly. This increased column stability may help prevent actuator seizures and other failures resulting from racking movements that result in moment forces on interior components of actuator 400 (e.g., racking of piston rod 430 relative to pressurized balance tube 440 and/or the walls of chamber 410). Three actuator assemblies 500 are provided in the example of FIG. 5 to tilt and move swashplate 112 at various angles.

For fly-by-wire applications, an electronic transducer may communicate the stroke position of the actuator to the flight control computers. Although transducers could be installed in the center of the balance rod or balance tube to provide protection from damage and minimize envelope, teachings of certain embodiments recognize that, because this internal volume may be used for the extend piston area, the transducers may be moved to the protected and unused envelope created at the center of the three joined cylinders.

Modifications, additions, or omissions may be made to the systems and apparatuses described herein without departing from the scope of the invention. The components of the systems and apparatuses may be integrated or separated.

Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A rotorcraft, comprising:
   a body;
   a rotor system coupled to the body, the rotor system comprising at least one rotor blade; and
   an actuation system in mechanical communication with the rotor system, the actuation system comprising a first actuator, the first actuator comprising:
   a chamber having a first port and a second port;
   a piston disposed within the chamber, the piston comprising a first surface, a second surface, and an elongated conduit coupling the first surface to the second surface, the first surface being disposed between the first port and the second port, the second surface being offset from the first surface;
   a tube disposed at least partially within the elongated conduit of the piston, the tube comprising a third port disposed within the elongated conduit of the piston and a fourth port disposed outside of the elongated conduit of the piston,
   wherein the first surface separates the first port and the second port such that first surface, the first port, the elongated conduit, and the chamber at least partially define a first hydraulic volume,
   wherein a second portion of the chamber opposite the piston from the first hydraulic volume is in fluid communication with the second port, and
   wherein the second port is vented to atmosphere.

2. The rotorcraft of claim 1, wherein a first hydraulic fluid source provides hydraulic fluid to the first hydraulic volume.

3. The rotorcraft of claim 1, wherein increasing a hydraulic pressure of fluid within the first hydraulic volume causes the piston to move in a retract direction.

4. The rotorcraft of claim 1, wherein the second surface, the elongated conduit, and the tube at least partially define a second hydraulic volume.

5. The rotorcraft of claim 4, wherein a second hydraulic fluid source provides hydraulic fluid to the second hydraulic volume.

6. The rotorcraft of claim 4, wherein increasing a hydraulic pressure of fluid within the second hydraulic volume causes the piston to move in an extend direction.

7. The rotorcraft of claim 1, the actuator system further comprising a second actuator, a third actuator, and a yoke coupling the mechanical outputs of the first, second, and third actuators.

8. The rotorcraft of claim 1, wherein the rotor system comprises a tiltrotor system tiltable between an airplane mode and a helicopter mode.

9. An actuator, comprising:
   a chamber having a first port and a second port;
   a piston disposed within the chamber, the piston comprising a first surface, a second surface, and an elongated conduit coupling the first surface to the second surface, the first surface being disposed between the first port and the second port, the second surface being offset from the first surface;
   a tube disposed at least partially within the elongated conduit of the piston, the tube comprising a third port disposed within the elongated conduit of the piston and a fourth port disposed outside of the elongated conduit of the piston,
   wherein the first surface separates the first port and the second port such that first surface, the first port, the elongated conduit, and the chamber at least partially define a first hydraulic volume,
   wherein a second portion of the chamber opposite the piston from the first hydraulic volume is in fluid communication with the second port, and
   wherein the second port is vented to atmosphere.

10. The actuator of claim 9, wherein a first hydraulic fluid source provides hydraulic fluid to the first hydraulic volume.

11. The actuator of claim 9, wherein increasing a hydraulic pressure of fluid within the first hydraulic volume causes the piston to move in a retract direction.

12. The actuator of claim 9, wherein the second surface, the elongated conduit, and the tube at least partially define a second hydraulic volume.

13. The actuator of claim 12, wherein a second hydraulic fluid source provides hydraulic fluid to the second hydraulic volume.

14. The actuator of claim 12, wherein increasing a hydraulic pressure of fluid within the second hydraulic volume causes the piston to move in an extend direction.

* * * * *